US011337356B2

(12) United States Patent
Helmich et al.

(10) Patent No.: US 11,337,356 B2
(45) Date of Patent: May 24, 2022

(54) CROP ORIENTATION SYSTEM AND METHOD

(71) Applicant: Deere & Company, Moline, IL (US)

(72) Inventors: Sam R. Helmich, West Des Moines, IA (US); David J. Glass, West Des Moines, IA (US)

(73) Assignee: DEERE & COMPANY, Moline, IL (US)

( * ) Notice: Subject to any disclaimer, the term of this patent is extended or adjusted under 35 U.S.C. 154(b) by 125 days.

(21) Appl. No.: 16/817,202

(22) Filed: Mar. 12, 2020

(65) Prior Publication Data

US 2021/0282309 A1  Sep. 16, 2021

(51) Int. Cl.
*A01B 69/04* (2006.01)
*A01B 76/00* (2006.01)
*A01B 79/00* (2006.01)
*G05D 1/02* (2020.01)

(52) U.S. Cl.
CPC ............ *A01B 69/008* (2013.01); *A01B 76/00* (2013.01); *A01B 79/005* (2013.01); *G05D 1/0212* (2013.01); *G05D 1/0276* (2013.01); *G05D 2201/0201* (2013.01)

(58) Field of Classification Search
CPC ..... A01B 69/008; A01B 76/00; A01B 79/005; G05D 1/0276; G05D 1/0212; G05D 2201/0201
See application file for complete search history.

(56) References Cited

U.S. PATENT DOCUMENTS

| | | | |
|---|---|---|---|
| 5,709,271 A * | 1/1998 | Bassett | A01B 63/114 111/134 |
| 6,041,582 A | 3/2000 | Tiede et al. | |
| 6,686,951 B1 | 2/2004 | Dickson et al. | |
| 7,242,791 B2 * | 7/2007 | Han | G05D 1/0278 382/104 |
| 8,121,345 B2 * | 2/2012 | Jochem | G06K 9/00798 382/103 |
| 8,359,139 B2 * | 1/2013 | Wang | A01B 69/007 701/50 |
| 8,498,788 B2 | 7/2013 | Kondekar | |
| 9,489,576 B2 | 11/2016 | Johnson et al. | |
| 10,426,078 B2 | 10/2019 | Rylander | |

(Continued)

OTHER PUBLICATIONS

Geoff Boeing, Applied Network Science, Urban Spatial Order: Street Network Orientation, Configuration, and Entropy, https://doi.org/10.1007/s41109-019-0189-1, 2019. (19 pages).

(Continued)

*Primary Examiner* — Mussa A Shaawat
(74) *Attorney, Agent, or Firm* — Klintworth & Rozenblat IP LLP

(57) ABSTRACT

A crop orientation system includes a controller having a processor and memory coupled to the processor and storing instructions. The processor executes the stored instructions to: determine first heading values for a first vehicle at intervals during a first crop planting event over a first field; generate a first set of histogram values representing the first heading values for the first vehicle during at least a portion of the first crop planting event over the first field; and generate display signals to render a first histogram display based on the first set of histogram values for a first user associated with the first vehicle.

20 Claims, 5 Drawing Sheets

(56) References Cited

U.S. PATENT DOCUMENTS

| | | | |
|---|---|---|---|
| 10,579,068 B2 | 3/2020 | Madsen et al. | |
| 2006/0175541 A1* | 8/2006 | Eglington | G05D 1/0274 250/221 |
| 2007/0001097 A1* | 1/2007 | Wei | A01B 69/001 250/208.1 |
| 2007/0005208 A1* | 1/2007 | Han | A01B 69/008 701/50 |
| 2007/0269114 A1* | 11/2007 | Jochem | G06K 9/00798 382/209 |
| 2007/0271012 A1* | 11/2007 | Jochem | A01D 41/1278 701/28 |
| 2007/0271013 A1* | 11/2007 | Jochem | G01C 11/00 701/28 |
| 2008/0103690 A1* | 5/2008 | Dix | G05D 1/0278 701/516 |
| 2010/0318253 A1* | 12/2010 | Brubaker | G05D 1/0274 701/25 |
| 2012/0109614 A1* | 5/2012 | Lindores | G06K 9/00657 703/11 |
| 2018/0108123 A1* | 4/2018 | Baurer | G06F 16/5866 |
| 2018/0359904 A1* | 12/2018 | Foster | G05D 1/0223 |
| 2018/0364739 A1* | 12/2018 | Foster | A01B 69/00 |
| 2020/0019752 A1* | 1/2020 | Frei | G06K 9/6256 |
| 2020/0281110 A1* | 9/2020 | McNichols | G06N 3/126 |
| 2021/0132618 A1* | 5/2021 | Van Roekel | G05D 1/024 |
| 2021/0195824 A1* | 7/2021 | Van Roekel | G01S 13/88 |

OTHER PUBLICATIONS

Geoff Boeing, Comparing US City Street Organizations, Planning—https://GeoffBoeing.com/Category/Planning/, Jul. 2018. (6 pages).

Extended European Search Report and Written Opinion issued in European Patent Application No. 21154770.8, dated Jul. 19, 2021, in 09 pages.

* cited by examiner

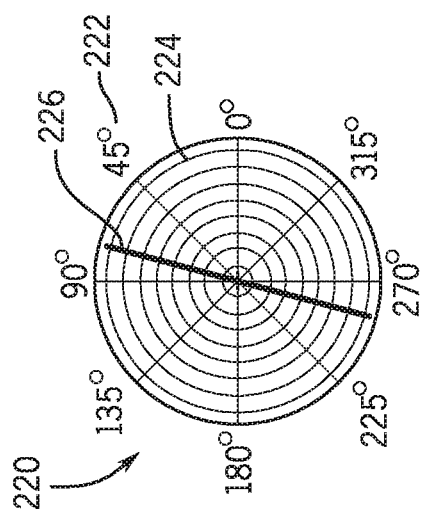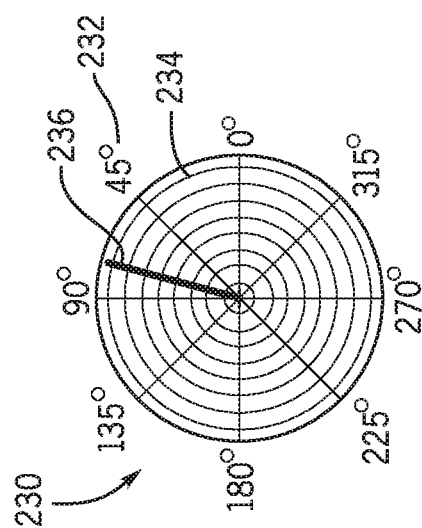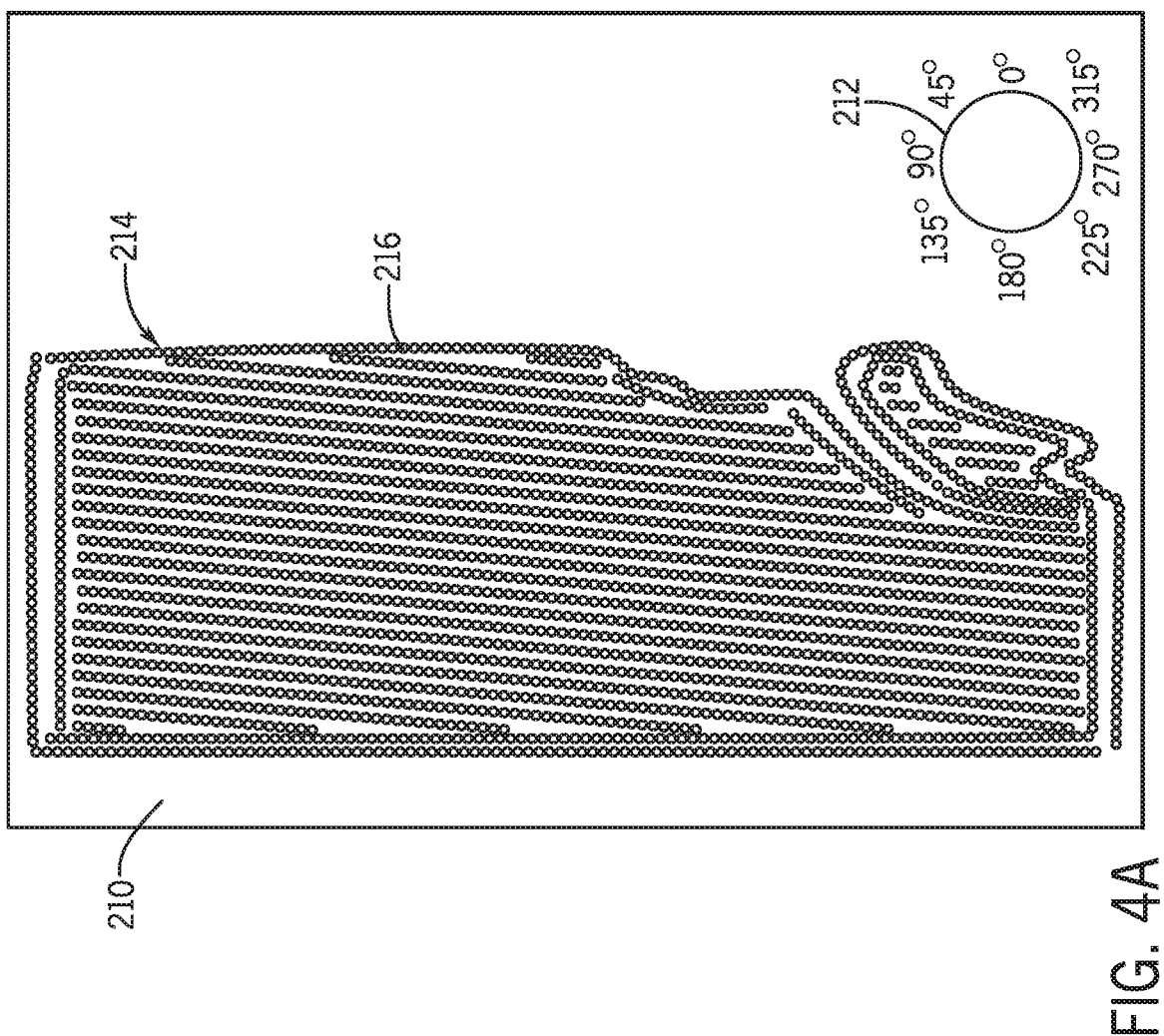

CROP ORIENTATION SYSTEM AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to agricultural work vehicle systems and methods, particularly to work vehicle systems and methods used during an agricultural planting event.

BACKGROUND OF THE DISCLOSURE

Work vehicles perform functions in various industries, including agricultural, mining, forestry, and construction. In some applications, work vehicles must select and traverse a path over an area. One such example is an agricultural planting vehicle traversing a field in rows to plant crop precursors such as seeds. Typically, such paths result from an operator manually maneuvering over and across the field along the regular rows. In general, operators of agricultural planting vehicles maintain consistent rows of precursors year after year or season after season.

SUMMARY OF THE DISCLOSURE

The disclosure provides a system and method for monitoring, evaluating, and displaying crop orientation.

In one aspect, the disclosure provides a crop orientation system with a controller having a processor and memory coupled to the processor and storing instructions. The processor executes the stored instructions to: determine first heading values for a first vehicle at intervals during a first crop planting event over a first field; generate a first set of histogram values representing the first heading values for the first vehicle during at least a portion of the first crop planting event over the first field; and generate display signals to render a first histogram display based on the first set of histogram values for a first user associated with the first vehicle.

In another aspect, the disclosure provides a crop orientation system associated with a work vehicle with a sensor configured to collect first heading values for the work vehicle during a first planting event over a first field; and a controller in communication with the sensor. The controller is configured to: generate a first set of histogram values representing the first heading values for the first vehicle during at least a portion of the first crop planting event over the first field, and generate display signals to render a first histogram display based on the first set of histogram values. The crop orientation system further includes a display device in communication with the controller and configured to render the first histogram display on the work vehicle.

The details of one or more embodiments are set forth in the accompanying drawings and the description below. Other features and advantages will become apparent from the description, the drawings, and the claims.

BRIEF DESCRIPTION OF THE DRAWINGS

FIG. 4A is a second example vehicle path for which the crop orientation system of FIG. 2 may be implemented according to an example embodiment;

FIGS. 4B and 4C are example crop orientation displays generated in response to the vehicle path of FIG. 4A;

Like reference symbols in the various drawings indicate like elements.

DETAILED DESCRIPTION

Figure 1:
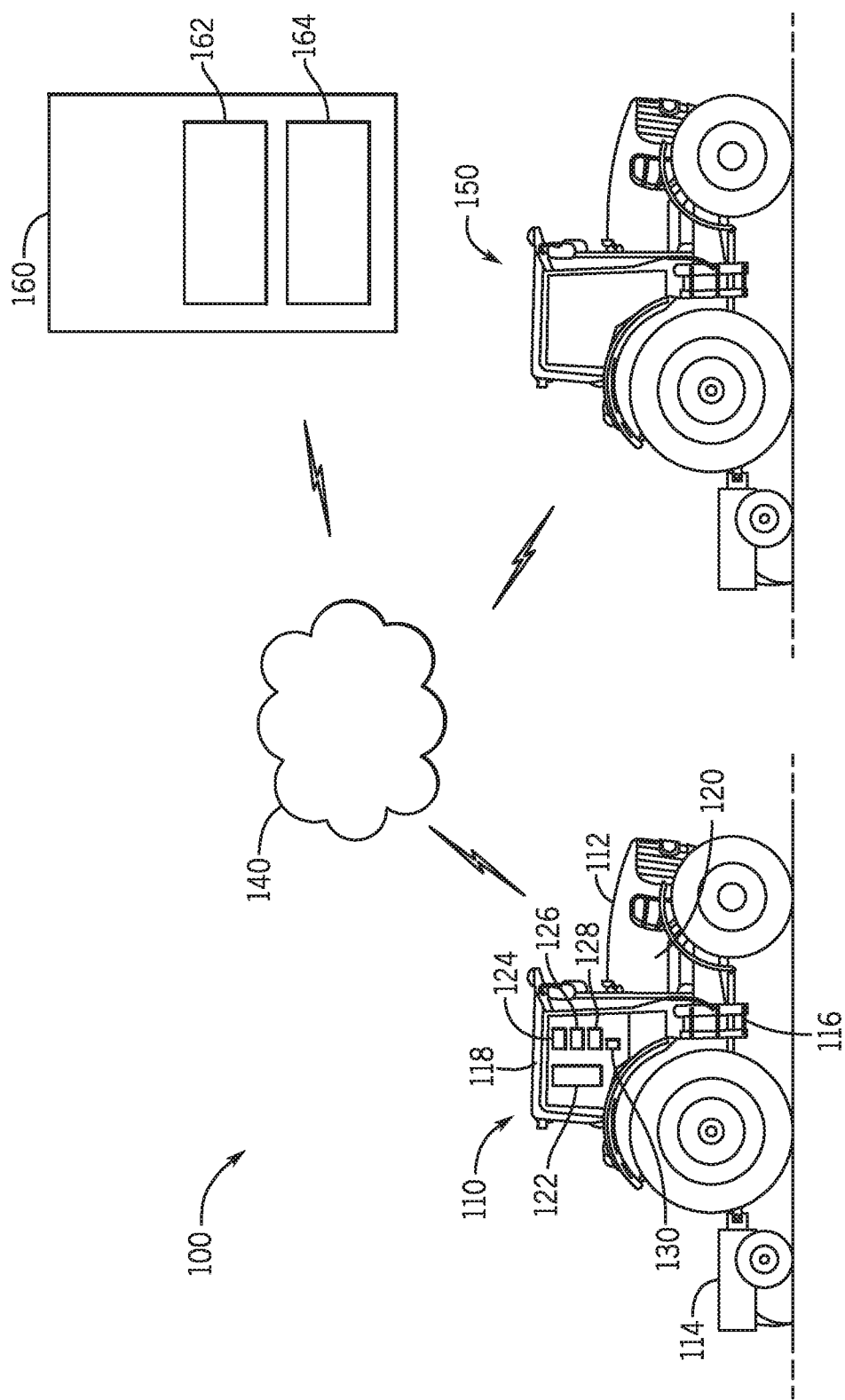
FIG. 1 is a schematic view of one implementation of a crop orientation system associated with agricultural planting events according to an example embodiment.

The following describes one or more example embodiments of the disclosed system and method, as shown in the accompanying figures of the drawings described briefly above. Various modifications to the example embodiments may be contemplated by one of skill in the art.

An operator may use a work vehicle in the form of an agricultural planting vehicle to plant seeds, seedlings, plants, root stock, bulbs, or other crop precursors (generally, "crop precursors") in rows over a field during a planting event. The work vehicle may traverse a path that results in generally parallel and uniform, linear or contoured, rows of crop precursors. In some instances, this operation may be repeated season after season in which rows from the present season are formed over the rows from previous seasons, typically with little consideration for alternate orientations. However, it may be beneficial to consider and implement rows with different orientations relative to previous years or seasons such that crop precursors are not planted directly over crop remnants from the previous years or seasons. Such benefits may result from the avoidance of root system conflicts and/or nutrient depletion, thereby optimizing planting efficiency and yield.

In one example, the crop orientation system operates to collect and determine heading values for a work vehicle at intervals during a crop planting event over a field; generate a set of histogram values representing the heading values for the work vehicle during at least a portion of the crop planting event over the field; and generate display signals to render a histogram display based on the set of histogram values for a user associated with the work vehicle. The histogram display may be formed by the first set of histogram values mapped onto a radial coordinate system as a radial plot, including 360° radial coordinate system and/or 180° radial coordinate system in which histogram values within the set of histogram values that are over 180° are indexed by 180°. As a result of the histogram displays, a user may immediately and clearly view and understand the primary orientation of the rows resulting from the planting event. In particular, the histogram display provides an unconventional and/or powerful mechanism for conveying a form of crop information previously unavailable and thus unconsidered. Additionally, the crop orientation system may receive and evaluate crop data associated with the crop planting event and other planting events from the user and/or other users. The crop orientation system may generate recommendations based on the evaluations as individual evaluations for a particular field or user and/or as crowd-sourced recommendations reflecting the experiences of a number of fields and users, thereby providing additional use and benefits for this type of information in order to improve efficiency and planting operations.

The following describes one or more example implementations of the disclosed row orientation systems and methods for a field during planting events, as shown in the accompanying figures of the drawings described briefly above. Generally, the disclosed systems and methods operate in the context of an agricultural planting machine in order to monitor, evaluate, and display crop orientation information for one or more operators that provide for improved efficiency, operation, and production as compared to conventional systems.

FIG. 1 is an example environment in which a crop orientation system 100 may be implemented in order to monitor, display, evaluate, and/or advise on crop orientation for one or more operators. Generally, the crop orientation system 100 may be implemented in, or associated with, one or more work vehicles 110, 150 and/or a monitoring center 160 that may communication over a network 140. Although two work vehicles 110, 150 are depicted in FIG. 1 and a representative one of the work vehicles 110 is discussed in greater detail below, the crop orientation system 100 may be used with respect to any number of vehicles, including with or without the monitoring center 160. In various examples, the crop orientation system 100 may be a distributed system and/or a stand-alone system. An introduction of the work vehicles 110, 150 and the monitoring center 160 will be provided below prior to a more detailed description of operation of the crop orientation system 100.

In one embodiment, the work vehicle 110 is in the form of a tractor 112 that tows a planting apparatus 114 (e.g., such that the work vehicle 110 may be considered an agricultural planting vehicle or planter). The tractor 112 has a vehicle frame 116 supporting the cab 118, and generally, the tractor 112 includes a powertrain 120 supported on the frame 116 that generates power for propulsion and/or other tasks to be performed by the work vehicle 110. In one example, the powertrain 120 may include an engine, transmission, steering system, wheels, and the like for propelling and maneuvering the work vehicle 110, either autonomously or based on commands by the operator. The work vehicle 110 may include various other components or systems that are typical on work vehicles. Examples include actuation systems, lubrication and cooling systems, battery systems, exhaust treatment systems, braking systems, and the like.

In this example, the planting apparatus 114 is towed behind the tractor 112 to dispense seeds, root stocks, or crop precursors (generally, "crop precursors") as the work vehicle 110 traverses the field, either automatically or based on commands from the operator. As such, the planting apparatus 114 may include any suitable components, including supply bins, actuators, controllers, frames, valves, wheels, openers, tanks, meters, shanks, and the like. It should be noted that the crop orientation system 100 may be used with respect to any suitable vehicle, planting apparatus, agricultural machine or vehicle, or other type of work vehicle or machine.

The work vehicle 110 may further include a vehicle controller 122 (or multiple controllers) to control various aspects of the operation of the work vehicle 110. For example, the vehicle controller 122 may also facilitate automatic or manual maneuvering of the vehicle traversing the field and actuation of the planting apparatus 114 during a planting event. Additionally, in some embodiments, the vehicle controller 122 may implement any or all (or none) of the functions of the crop orientation system 100 discussed herein.

Generally, the vehicle controller 122 (or others) may be configured as a computing device with associated processor devices and memory architectures, as a hard-wired computing circuit (or circuits), as a programmable circuit, as a hydraulic, electrical or electro-hydraulic controller, or otherwise. As such, the vehicle controller 122 may be configured to execute various computational and control functionality with respect to the work vehicle 110, the tractor 112, the planting apparatus 114, and/or the crop orientation system 100. In some embodiments, the vehicle controller 122 may be configured to receive input signals in various formats from a number of sources (e.g., including from the operator via operator input devices 124, various sensors 130, units, and systems onboard or remote from the work vehicle 110, and/or other aspects of the crop orientation system 100); and in response, the vehicle controller 122 generates one or more types of commands for implementation by the various systems on or outside the work vehicle 110.

As one example discussed in greater detail below, the vehicle controller 122 may facilitate operation of the crop orientation system 100, particularly with respect to collecting, formatting, processing, and/or sending vehicle heading information at regular intervals during a planting event. The heading data may be in the form of raw data from applicable sensors 130 described below (or other sources) or undergo some processing in the vehicle controller 122 in order to extract the desired characteristics. The vehicle controller 122 also functions to receive, generate, display, and/or monitor crop orientation information and recommendations based on the vehicle heading information. Moreover, the vehicle controller 122 may also implement one or more aspects of the crop orientation system 100 described below with respect to the monitoring center 160. Further details will be provided below.

In some embodiments, the vehicle controller 122 may be configured to receive input commands and to interface with an operator via human-vehicle interfaces in the forms of one or more operator input devices 124 and/or one or more display devices 126, which may be disposed inside the cab 118 of the work vehicle 110 for easy access by the vehicle operator. The operator input devices 124 may be configured in a variety of ways. In some embodiments, the one or more operator input devices 124 may include devices with one or more joysticks, various switches or levers, one or more buttons, a touchscreen interface, a keyboard, a speaker, a microphone associated with a speech recognition system, or various other human-machine interface devices. As described in greater detail below, the operator may use the operator input devices 124 to steer the work vehicle 110 during an agricultural event, to interact with the planting apparatus 114, and/or to interact with the crop orientation system 100 and the display device 126 to view heading and/or crop orientation information. The display device 126 may be implemented as a flat panel display or other display type that is integrated with an instrument panel or console of the work vehicle 110. The display device 126 may include any suitable technology for displaying information, including, but not limited to, a liquid crystal display (LCD), light emitting diode (LED), organic light emitting diode (OLED), plasma, or a cathode ray tube (CRT). As described in greater detail below, the display device 126 may function to render the crop orientation displays generated in accordance with operation of the crop orientation system 100, including those generated by the monitoring center 160, for display to the operator of the work vehicle 110.

The work vehicle 110 further includes a vehicle communication component 128. The vehicle communication component 128 enables communication between the vehicle controller 122, the monitoring center 160, and other information sources. The vehicle communication component 128 includes any suitable system for sending and/or receiving data, including directly (e.g., via Bluetooth®, radio frequency signals, or the like) or via network 140. Thus, the vehicle communication component 128 may include a network interface or adapter, a Bluetooth® transceiver, a radio transceiver, a cellular transceiver, an LTE transceiver and/or a Wi-Fi transceiver. The network 140 may include or otherwise cooperate with the JDLink™ system commercially available from Deere & Company of Moline, Ill.

The work vehicle 110 further includes various sensors 130 on the tractor 112 and/or planting apparatus 114 that function to collect information associated with the work vehicle 110. Such information may be provided to the vehicle controller 122 and/or the vehicle communication component 128 for potential transmission and use by the crop orientation system 100. In one example, the sensors 130 include a heading sensor, such as compass that determines vehicle heading. Other mechanisms may be used to determine heading, including one or more speed, location, proximity, and/or position sensors. As described in greater detail below, the vehicle controller 122 may operate to send various types of information, such as heading information collected by sensors 130, to the monitoring center 110 as vehicle data.

It should be noted that various aspects of the work vehicle 110 that interact with the crop orientation system 100 and other vehicle systems may be embodied as a personal device associated with the vehicle operator and/or the work vehicle 110. Such aspects may include one or more functional units of the vehicle controller 122, operator input device 124, display device 126, vehicle communication component 128, and sensors 130. Such devices implementing the crop orientation system 100 associated with the work vehicle 110 may include servers, desktop computers, laptop computers, tablet computers, or other mobile devices, such as palm top computers, cell phones, smart phones, multimedia players, personal digital assistants, etc.

As noted above, the crop orientation system 100 may be implemented on the first vehicle 110 as an agricultural planting machine, as well as additional machines, including the second representative work vehicle 150 depicted in FIG. 1, also functioning as an agricultural planting machine. The second work vehicle 150 may be similar or different to the first work vehicle 110 discussed above, and include one or more of the components discussed above. As discussed in greater detail below, the second work vehicle 150 may send additional heading information to the monitoring center 160 and receive associated crop orientation information in response.

As noted above, the monitoring center 160 may be in communication with the work vehicles 110, 150 to implement aspects of the crop orientation system 100, such as to receive and evaluate heading and crop information from one or more operators to generate crop orientation information recommendations for use by the operators within the work vehicles 110, 150, as well as from similar machines, devices, and systems from across a group of operators or customers. In some examples, the monitoring center 160 may operate as "backend" system or server that facilities operation within a field or fields, including the collection and creation of various types of data.

Generally, the monitoring center 160 may be considered to have at least one monitoring center controller 162 and at least one communication component 164, as well as data stores, interface components, and the like (not shown in FIG. 1). In one example, the monitoring center controller 162 and monitoring center communication components 164 may have similar elements, characteristics, and functionality to the vehicle controller 122 and vehicle communication component 128, respectively, as discussed above. As such, the monitoring center controller 162 is in communication with the work vehicles 110, 150 via the monitoring center communication component 164 over a suitable interconnection architecture or arrangement that facilitates transfer of data, commands, power, etc., such as network 140, to implement one or more aspects of the crop orientation system 100, including providing requested or desired data for carrying out the associated functions. Additional and more specific information regarding operation of the monitoring center controller 162 within the context of the crop orientation system 100 is provided below with reference to FIG. 2.

Figure 2:
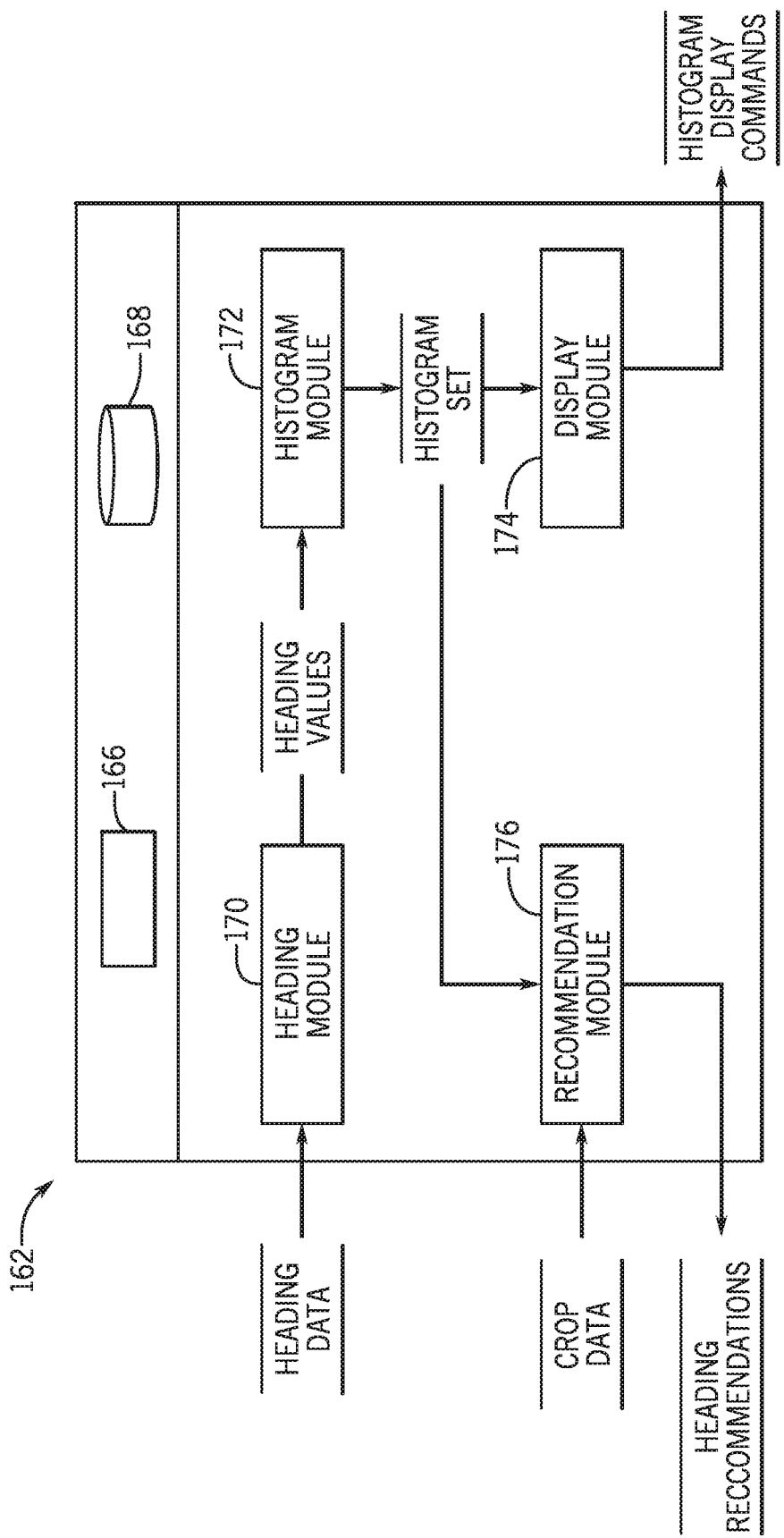
FIG. 2 is a schematic block diagram of the example crop orientation system of FIG. 1 according to an example embodiment.

The view of FIG. 2 provides an example schematic operation of the crop orientation system 100 with dataflows into, out of, and within the monitoring center controller 162. In this example, the monitoring center controller 162 may be considered to be organized as one or more functional units or modules 170, 172, 174, and 176 (e.g., software, hardware, or combinations thereof). As an example, each of the modules 170, 172, 174, 176 may be implemented with processing architecture such as a processor 166 and memory 168. For example, the monitoring center controller 162 may implement the modules 170, 172, 174, 176 with the processor 166 based on programs or instructions stored in memory 168. In the depicted embodiment, the modules 170, 172, 174, 176 include a heading module 170, a histogram module 172, a display module 174, and a recommendation module 176. The data flows and organization depicted in FIG. 2 are merely examples, and other mechanisms for performing similar functions may be provided, certain functions may be omitted, and additional functions may be added. Additional details about operation of these modules 170, 172, 174, 176 will be provided below with reference to FIGS. 1 and 2.

In the context of the discussion of FIG. 2, the first work vehicle 110 of FIG. 1 is referenced. However, in some examples, the monitoring center controller 162 may also receive similar data and performing similar operations with respect to the second work vehicle 150, as well as other vehicles.

From the context of the first work vehicle 110, implementation of the crop orientation system 100 and associated collection of the heading data may be enabled or activated in a number of ways. In one example, the first work vehicle 110 may collect heading data based on a manual activation by the operator (e.g., via the operator input device 124). In further examples, the first work vehicle 110 may collect heading data based on an automatic activation, e.g., upon crossing a geographical boundary or upon actuation the planting apparatus 114. Generally, however, operation of the crop orientation system 100 may at least partially occur during a planting event in which the work vehicle 110 deposits crop precursors in rows over a field. In one example, the planting event corresponds to an entire field on which a crop is to be planted during a particular season.

Figure 3B:
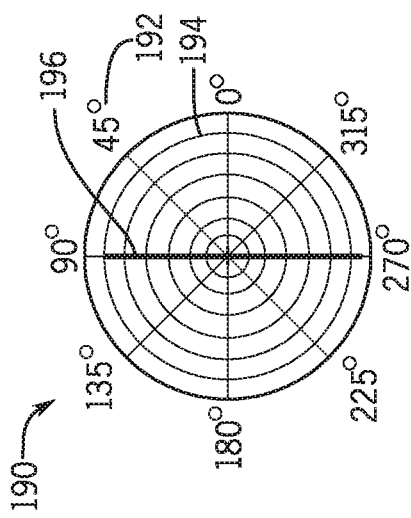
FIGS. 3B and 3C are example crop orientation displays generated in response to the vehicle path of FIG. 3A.
Figure 3C:
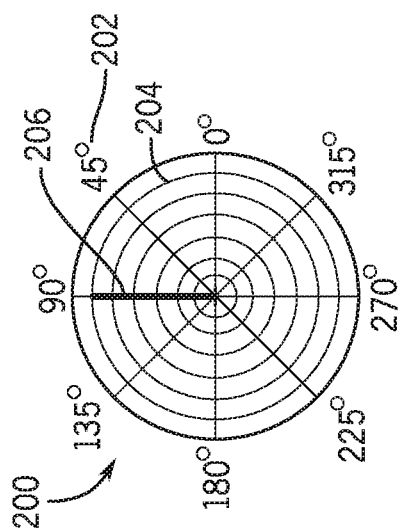
Figure 3A:
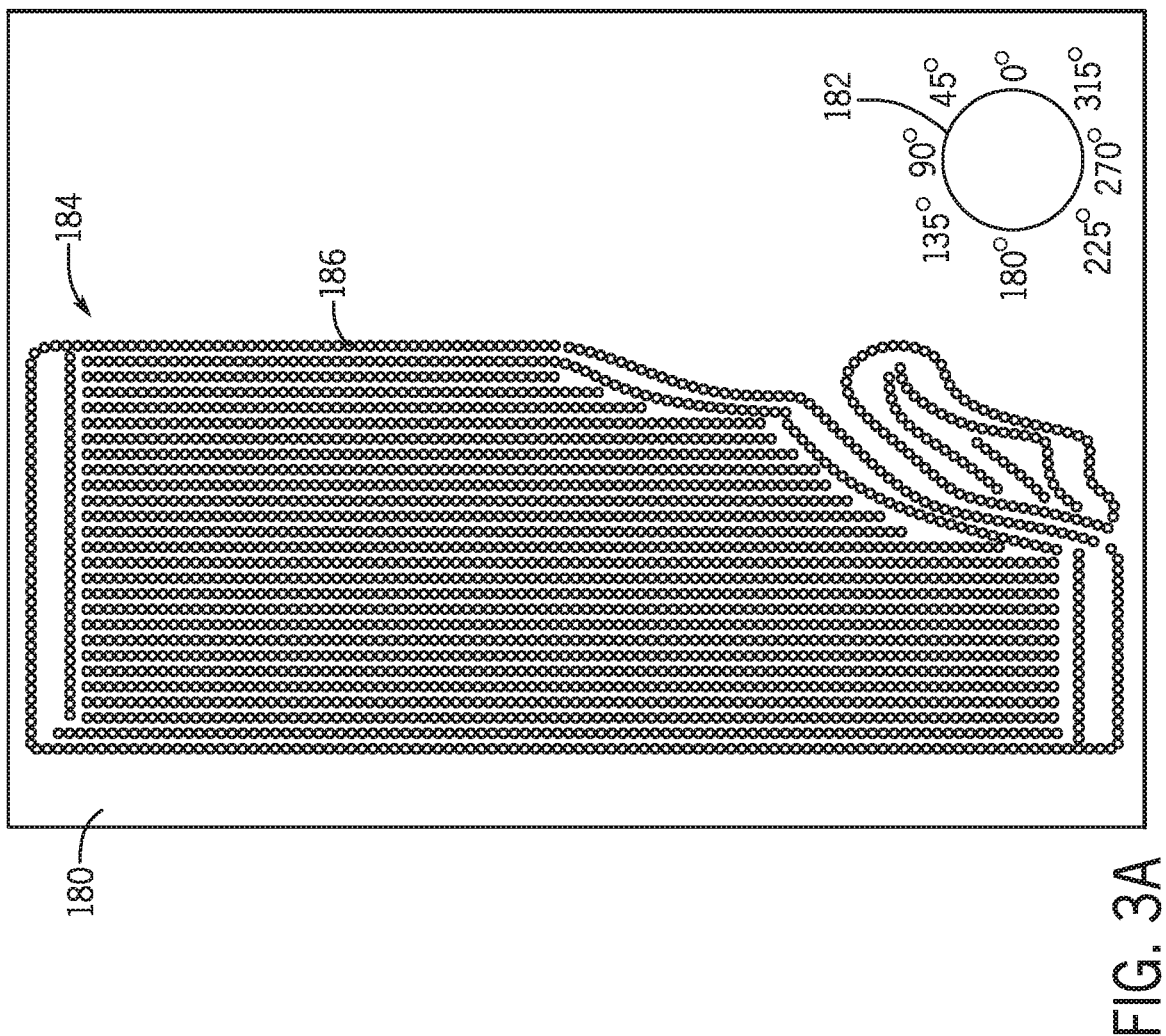
FIG. 3A is a first example vehicle path for which the crop orientation system of FIG. 2 may be implemented according to an example embodiment.

Briefly, reference is made to FIG. 3A to facilitate understanding of the collection of heading data by the work vehicle 110. As one example, the view of FIG. 3A particularly depicts a "field" (representing any type of geographical area) 180 in which the work vehicle 110 performs a planting operation or other type of work task. In one example, a quantitative context of vehicle heading within the field 180 is provided by the depicted radial heading legend 182, which reflects heading references from 0° to 359° (e.g., back to 0°). In this example as indicated by the heading legend 182, a heading orientated directly to the right (or East) side of the field is 0°, a heading oriented directly to the top (or North) side is 90°, a heading oriented directly to the left (or West) side is 180°, and a heading oriented directly to the bottom (or South) side is 270°.

During operation, the work vehicle 110 traverses the field 180 to plant the crop precursors, typically more or less in regular rows, along a path 184. While traversing the path 184, the sensor 130 may collect data associated with the respective heading of the work vehicle 110 at regular intervals. In one example, the heading data may be quantified according to the heading legend 182 (e.g., 0° to 359°). In the view of FIG. 3A, each interval at which heading data is collected is represented by a dot 186, and collectively over time, the dots 186 indicate the path 184 that the work vehicle 110 traversed along the field during the planting event. In one embodiment, the interval may be a time interval, a distance interval, or a planting interval (e.g., representing a deposit one or more crop precursor increments). Additionally, the interval may be selected on one or more following factors: an average or maximum vehicle velocity, the size of the field, the dimensions of the field, the quantity of external and internal boundaries, and the distances between boundaries.

As shown in the particular example of FIG. 3A, the path 184 is generally formed by rows extending at headings or orientations of 90° or 270°, as well as some rows extending 0° or 180° along the top and bottom of the field 180 and extending at diagonal angles along the lower right side of the field 180. In any event, during the planting event, each interval of vehicle heading data representing the orientation of the work vehicle 110 at the respective interval is collected by the sensor 130. Subsequently, the vehicle controller 122, via the vehicle communication component 128, sending the heading data to the monitoring center 160.

Returning to FIG. 2, the heading module 170 of the monitoring center controller 162 receives the heading data from the work vehicle 110. In one example, the heading module 170 receives a series of heading data representing the field 180 (e.g., in FIG. 3A, the heading for each dot or interval over the field 180) and determines a set of heading values corresponding to the heading data, as well as any associated identifying information such as field, operator, or time information. In particular, the heading module 170 determines the heading values corresponding to the heading data from the work vehicle 110 during the planting event and provides the heading values to the histogram module 172. In effect and as introduced above, the heading values for the particular planting operation may be considered the headings of each interval on the radial scale from 0° to 359°.

In some embodiments, monitoring center controller 162 may receive a complete set of heading data directly from the work vehicle 110 for a particular planting event. In other words, upon completion of receipt and processing of the heading data over the entire field 180, the heading module 170 sends the set of corresponding heading values to the histogram module 172. In other embodiments, the heading module 170 may continually receive heading data, evaluate the heading data, and send the incremental heading values based on the heading data to the histogram module 172. In other words, either the heading module 170 or the histogram module 172 (or other module) may incrementally collect heading data and/or values in order to associate the data and/or values with the single field 180 and planting operation, or such heading data and/or values may be sent and received as a set for an entire planting event.

Continuing with reference to FIG. 2, the histogram module 172 receives and evaluates the heading values, and further generates a histogram set according to the heading data. In generating the histogram set, the histogram module 172 determines (e.g., tallies) the cumulative number of instances of each heading value within set. For example, the histogram module 172 determines the quantity of heading values within the set having a value of 0°, the quantity of heading values within the set having a value of 1°, the quantity of heading values within the set having a value of 2°, and so on. In some examples, the histogram module 172 may have "bins" of heading values that are considered, e.g., the quantity of heading values within the set having values between 0° and 4°, the quantity of heading values within the set having values between 5° and 9°, the quantity of heading values within the set having values between 10° and 14°, and so on. In any event, upon completion of evaluation of the heading values, the histogram module 172 has a set of histogram values representing the quantity of each instance of heading value or bin of values (generally "values"). The set of histogram values from histogram module 172 may be sent to the display module 174. As noted above, in some examples, the histogram module 172 receives a complete set of heading data over a field during a single agricultural event (e.g., a complete planting). In other examples, the histogram module 172 receives incremental heading data as the work vehicle 110 traverses a field during the agricultural event, and in response, continually updates the set of histogram values for the work vehicle 110 during the planting operation.

In one embodiment, the display module 174 receives the set of histogram values and generates display signals that map the histogram values on a radial coordinate system as a histogram display. The histogram display signals may be sent to the work vehicle 110 for consideration by the operator, e.g., for display on the vehicle display device 126 or other display device.

As one example, a histogram display 190 is depicted in FIG. 3B that corresponds to the path 184 through the field 180 depicted in FIG. 3A. As noted above, the histogram display 190 may be displayed to the operator (e.g., on the display device 126).

Generally, the histogram display 190 is formed by the set of histogram values mapped onto a radial coordinate system with radial orientations 192 onto which the value quantities 194 may be mapped as vectors 196 extending from an origin. The radial orientation 192 (or direction) of a respective vector 196 represents the particular value, nature, identifier, type, or bin of the heading (e.g., 0°, 1°, 2°, and so on) within the set of histogram values, and the length of the vector 196 reflects the number of instances of that value (e.g., the number of interval instances at a heading of 0°, the number of interval instances at a heading of 1°, and so on). In histogram display 190, the orientations 192 of the heading values are reflected along the outer periphery, and the quantities 194 of the heading values at each orientation are reflected by the radial rings circumscribing the origin. Any suitable relative or absolute scaling may be provided for the radial rings representing the quantities 194. For example, the innermost ring may represent 10 instances of a respective heading value orientation, the next ring may represent 20 instances of a respective heading value orientation, and so on. In this manner, the directions and lengths of the histogram vectors 196 reflected in the histogram display 190 may enable an observer to determine the primary orientation or orientations of the work vehicle 110 and the relative (or absolute) number of such orientation or orientations, particularly as compared to any other orientations over the path traversed by the work vehicle 110 on the path 184 formed during the planting event. Moreover, since the heading data was collected during a planting event, the primary orientations reflected on the histogram display 190 represents the primary orientations of the resulting crop rows.

As noted above, the histogram display 190 of FIG. 3B corresponds to the path 184 depicted in FIG. 3A. As reflected by the histogram display 190 of FIG. 3B, the path 184 of FIG. 3A includes a number of parallel rows at 90° (e.g., in which the work vehicle 110 is pointing due North) and 270° (e.g., in which the vehicle 110 is pointing due South). In effect, the path 184 is primarily North-South rows, which are generally reflected in the relatively large vectors 196 extending at 90° and 270° on the histogram display 190. The path 184 of FIG. 3A also includes a few rows or portions at 0° and 180° (e.g., East-West path portions) at the top and bottom of the path 184, which are generally reflected in the relatively small vectors 196 extending at 0° and 180° on the histogram display 190. Since the instances of orientations centered around 90° and 270° occur much more often than the instances of orientations centered around 0° and 180°, the vectors 194 at 90° and 270° are much larger than the relatively small vectors 196 at 0° and 180°. In other words the path 184 includes a large number of North-South rows (at 90° and 270°) and a small number of East-West row (at 0° and 180°), as reflected by the nature of the histogram display 190. As also evident from FIG. 3A, the path 184 also includes a relatively small number of angled or diagonal portions, particularly in lower left side of the path 184 that reflect other histogram orientation values, such as approximately 45° and 225° (e.g., diagonal orientations). Although these histogram orientation values are reflected in the histogram set, the corresponding vectors may not be visible on the histogram display 190 due to the relatively small number of such instances and/or scaling, particularly as compared to the much higher quantity of histogram orientation values at 90° and 270° or even 0° and 180°.

Accordingly, the histogram display 190 provides an immediate and clear representation of the nature of the rows within the path 184 during the planting event, including the primary orientation and/or orientations of the rows. An operator may use this information in a number of ways, some of which are discussed in greater detail below.

The view of FIG. 3C provides an alternative histogram display 200 that may be generated by the crop orientation system 100, which may also represent the path 184 on the field 180 during the planting event depicted in FIG. 3A. As above, the histogram display 200 includes orientation values 202, quantities 204, and vectors 206 mapped onto the orientation values 202 and quantities 204. In some embodiments, the histogram display 200 of FIG. 3C may provide a simpler visual representation relative to the histogram display 190 of FIG. 3B. Spatially, a series of rows at 90° and 270° are identical to a series of rows at 90° (or 270°). In other words, during the planting event, an operator is typically impartial or neutral to the specific direction of the work vehicle 110 when forming the rows as compared to the overall orientation of the rows. The histogram display 200 of FIG. 3C utilizes the same histogram values as the histogram display 190 of FIG. 3B, except that the histogram values are "wrapped" 180° and only displayed on "top half" of the radial coordinate system of the histogram display 200 and/or any orientation over 180° is indexed by adding 180°. As such, the histogram display 200 indicates that the primary orientation of rows of path 184 of FIG. 3A are North-South rows (e.g., at 90°).

Accordingly, returning briefly FIG. 2, the display module 174 of the monitoring center controller 162 generates and sends the histogram display commands to the operator of the work vehicle 110 for display and consideration of a histogram display (e.g., histogram display 190 or histogram display 200). The histogram set from the histogram module 172 may also be provided to a recommendation module 176 of the monitoring center controller 162. The recommendation module 176 may also receive crop data associated with the planting event represented in FIGS. 3A-3C. Such crop data may include crop yield, planting efficiencies, and/or any suitable parameter to provide some type of quantitative or qualitative metric for the planting event, particularly the primary orientation (or orientations) of the rows of the planting event. The recommendation module 176 of the monitoring center controller 162 may collect histogram sets and crop data for a field over a number of seasons and/or histogram sets and crop data for multiple fields. In response, and as described in greater detail below, recommendation module 176 may generate heading recommendations for operators based on these collections of histogram sets and crop data. For example, the recommendation module 176 may generate an ideal or advantageous heading recommendation for an operator for a future planting event. Additional details about the recommendation module 176 are provided below.

As further examples, the views of FIGS. 4A-4C, 5A, and 5B provide representations resulting from other histogram sets (and crop data). The views of FIGS. 4A-4C, 5A, and 5B may represent other fields or may represent the field described above in different seasons, as described in greater detail below.

Initial reference is made to FIG. 4A, in which operator performs a planting operation on a field 210 with radial reference legend 212 along a path 214 formed by intervals 216 at which heading data is collected. By comparison with the path 184 of FIG. 3A, the path 214 of FIG. 4A is primarily formed by angled rows.

The histogram display 220 resulting from the path 214 of FIG. 4A is depicted in FIG. 4B in which the orientation values 222 and the value instances 224 are represented by vectors 226. As shown in FIG. 4B, the primary orientations of the angled rows of the path 214 from FIG. 4A are represented by the vectors 226 extending at approximately 75° and 255°. Additionally, as above, few horizontal rows (e.g., at 0° and 180°) of the path 214 of FIG. 4A are represented by the relatively small vectors 226 at 0° and 180° of FIG. 4B. The remaining rows and stray orientations of FIG. 4A are too infrequent to be represented in the histogram display 220 of FIG. 4B.

An alternative histogram display 230 is depicted in FIG. 4B in which the orientation values 232 and the value instances 234 are represented by vectors 236. The histogram display 230 of FIG. 4C utilizes the same histogram values as the histogram display 220 of FIG. 4B, except that the histogram values are "wrapped" 180° and only displayed on "top half" of the radial coordinate system of the histogram display 230 and/or the headings greater than 180° are indexed by 180° to be between 0° and 180°. As such, the histogram display 230 indicates that the primary orientation of rows of path 214 of FIG. 4A are angled at approximately 75°.

Figure 5B:
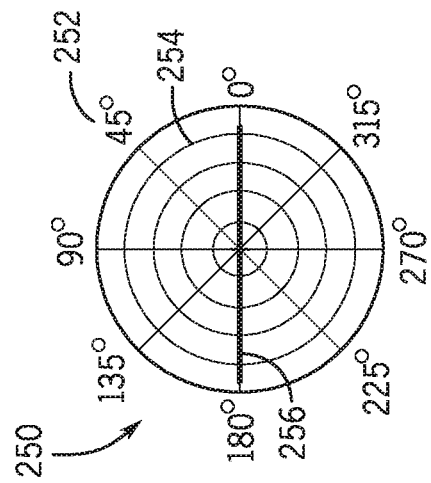
FIG. 5B is an example crop orientation display generated in response to the vehicle path of FIG. 5A.
Figure 5A:
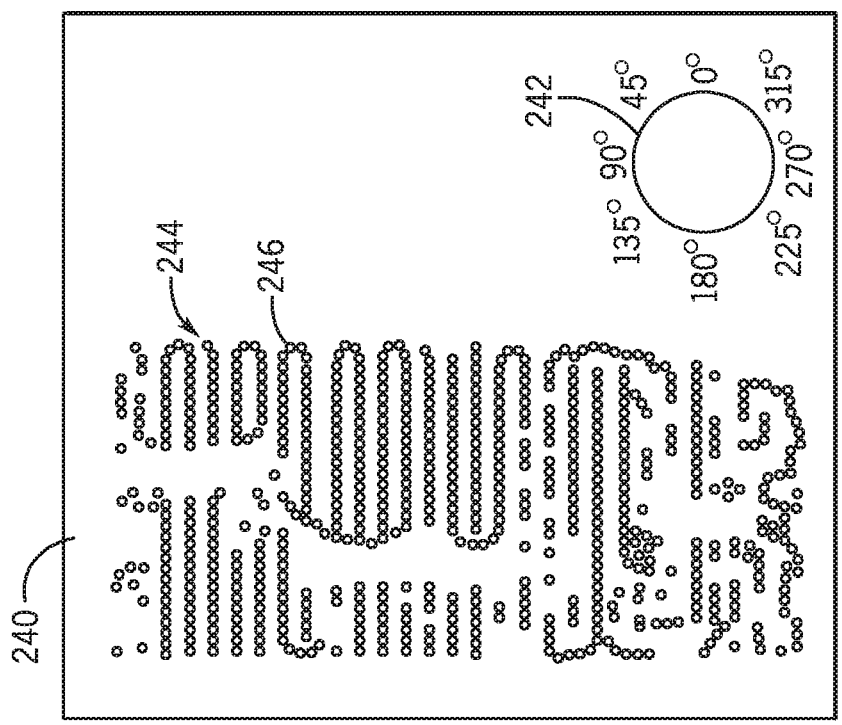
FIG. 5A is a third example vehicle path for which the crop orientation system of FIG. 2 may be implemented according to an example embodiment.

In FIG. 5A, a field 240 is represented with radial reference headings legend 242 along a path 244 formed by intervals 246 at which heading data is collected during a planting event. As shown, the path 244 of FIG. 5A is primarily formed by horizontal or East-West rows (e.g., at 0° and 180°). The histogram display 250 resulting from the path 244 of FIG. 5A is depicted in FIG. 5B in which the orientation values 252 and the value instances 254 are represented by vectors 256. As shown in FIG. 5B, the primary orientations of the rows of the path 244 from FIG. 5A are represented by the vectors 256 extending at approximately 0° and 180°. Additionally, as above, the remaining rows and stray orientations of FIG. 5A are too infrequent to be represented in the histogram display 250 of FIG. 5B.

In some embodiments and additionally referring again to FIG. 2, the planting events of fields 180, 210, 240 represented by histogram displays 190, 220, 250 may be considered with the crop data resulting from those planting events by the recommendation module 176 of the monitoring center controller 162. The crop data may be considered for an individual field over a number of seasons, or over a number of fields with modified orientations of rows. In other words, the histogram displays 190, 220, 250 may represent a single field over successive seasons; or the histogram displays 190, 220, 250 may be separate fields. In either case, the recommendation module 176 may consider the associated crop data with the histogram set of the histogram displays 190, 220, 250 in order to derive a judgement about a preferred or optimized modification to row orientations from season to season.

As an example, if fields 180, 210, 240 are considered a single field over a succession of three seasons, the histogram displays 190, 220 indicate that the row orientations are modified approximately 15° between the first season histogram display 190 and the second season histogram display 220 (e.g., from 90° and 270° to 75° and) 255°; and the histogram displays 220, 250 indicate that the row orientations are modified approximately 75° between the second season histogram display 220 and the third season histogram display 250 (e.g., from 75° and 255° to 0° and 180°). If the crop data associated with the second and third seasons indicates an improved yield (or other parameter) relative to crop data associated with the first and second seasons, the recommendation module 176 may generate a heading recommendation that states a larger row orientation modification (e.g., 75°) over successive seasons is better than a smaller row orientation modification (e.g., 15°). Or, the crop data may indicate that a relatively small row orientation modification is sufficient to result in acceptable crop yields. In effect, the recommendation module 176 may consider data from a number of fields and/or a number of operators to recommend one or more strategies for future planting event. Such evaluations by the recommendation module 176 may be enabled by algorithms, data analytics, and/or machine learning.

In some embodiments, the recommendation module 176 may be omitted. In addition or as an alternative, the operator may consider the histogram displays over a number of seasons and make an individual determination about a selected strategy for future seasons.

In some embodiments, upon determining a heading recommendation for a strategy or selecting an individual strategy, the crop orientation system 100 may facilitate the implementation of such a strategy during the planting event. In particular, the crop orientation system 100 may incrementally collect heading data and generate histogram display commands for each interval or group of intervals during the planting event. In effect, the crop orientation system 100 may continuously or regularly generate histogram display commands to display an ongoing and progressive histogram display within the cab of the working vehicle during the planting event. In other words, the crop orientation system 100 may "build," display, and update a histogram display representing heading values over time during the planting event. This enables the operator to monitor the primary orientation of rows during the planting event such that, if appropriate, course modifications may be implemented. As an example, if the operator has a heading strategy of row orientations of 75° and 255° as a 15° offset from a previous season, the operator may monitor the progress of implementing this strategy by observing a histogram display being built and updated as the operator traverses the field to form rows during the planting event.

Although not shown, operation of the crop orientation system 100 discussed above may also be expressed as a method performing the operational steps in accordance with the present disclosure. Such methods may be implemented with respect to one or more vehicles in combination with a monitoring center, a single vehicle, and/or the monitoring center cooperating with one or more vehicles. As can be appreciated in light of the disclosure, the order of operation is not limited to a sequential execution described above, but may be performed in one or more varying orders as applicable and in accordance with the present disclosure. Further one or more operational steps may be omitted and/or additional steps added.

Accordingly, embodiments discussed herein provide systems and methods to monitor, evaluate, and display crop orientation information.

Also, the following examples are provided, which are numbered for easier reference.

1. A crop orientation system comprising a controller having a processor and memory coupled to the processor and storing instructions, the processor executing the stored instructions to: determine first heading values for a first vehicle at intervals during a first crop planting event over a first field; generate a first set of histogram values representing the first heading values for the first vehicle during at least a portion of the first crop planting event over the first field; and generate display signals to render a first histogram display based on the first set of histogram values for a first user associated with the first vehicle.

2. The crop orientation system of example 1, wherein the processor further executes the stored instructions to generate the display signals such that the first histogram display is formed by the first set of histogram values mapped onto a radial coordinate system.

3. The crop orientation system of example 2, wherein the processor further executes the stored instructions to generate the display signals such that the first histogram display is formed by the first set of histogram values mapped onto a 360° radial coordinate system.

4. The crop orientation system of example 2, wherein the processor further executes the stored instructions to generate the display signals such that the first histogram display is formed by the first set of histogram values mapped onto a 180° radial coordinate system in which histogram values within the first set of histogram values that are over 180° are indexed by 180°.

5. The crop orientation system of example 1, wherein the processor further executes the stored instructions to receive first crop data associated with the first crop planting event and to generate a first recommendation for the first user associated with the first vehicle based on the first set of histogram values and the first crop data.

6. The crop orientation system of example 1, wherein the processor further executes the stored instructions to determine heading values for a second vehicle at intervals during a second crop planting event over a second field, generate a second set of histogram values representing the heading values for the second vehicle during at least a portion of the second crop planting event over the second field, and generate display signals to render a second histogram display based on the second set of histogram values for a second user associated with the second vehicle.

7. The crop orientation system of example 1, wherein the processor further executes the stored instructions to determine heading values for the first vehicle at intervals during a second crop planting event over the first field, generate a second set of histogram values representing the heading values for the first vehicle during at least a portion of the second crop planting event over the first field, and generate display signals to render a second histogram display based on the second set of histogram values for the first user associated with the first vehicle.

8. The crop orientation system of example 7, wherein the processor further executes the stored instructions to receive first crop data associated with the first crop planting event and second crop data associated with the second crop planting event and to generate a first recommendation for the first user associated with the first vehicle based on the first set of histogram values, the first crop data, the second set of histogram values, and the second crop data.

9. The crop orientation system of example 1, wherein the processor further executes the stored instructions to generate the first set of histogram values representing the heading values for the first vehicle during the first crop planting event as an entire event.

10. The crop orientation system of example 1, wherein the processor further executes the stored instructions to determine the first heading values over time and generate the first set of histogram values representing the first heading values as the first heading values are determined such that the display signals to render and update the first histogram display over time.

11. The crop orientation system of example 1, wherein the processor further executes the stored instructions to generate the first set of histogram values by counting each instance of a respective heading value, and generate the display signals such that the first histogram display is formed by a plurality of vectors in which a direction of each of the vectors represents the respective heading value and a length of each of the vectors represents the count of the respective heading value.

12. A crop orientation system associated with a work vehicle, comprising: a sensor configured to collect first heading values for the work vehicle during a first planting event over a first field; a controller in communication with the sensor, the controller configured to: generate a first set of histogram values representing the first heading values for the first vehicle during at least a portion of the first crop planting event over the first field, and generate display signals to render a first histogram display based on the first set of histogram values; and a display device in communication with the controller and configured to render the first histogram display on the work vehicle.

13. The crop orientation system of example 12, wherein at least a portion of the controller is located off-board the work vehicle.

14. The crop orientation system of example 12, wherein the controller is configured to generate the first set of histogram values and the display signals on-board the work vehicle.

15. The crop orientation system of example 12, wherein the controller is configured to generate the display signals such that the first histogram display is formed by the first set of histogram values mapped onto a radial coordinate system.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

As will be appreciated by one skilled in the art, aspects of the disclosed subject matter can be described in terms of methods, systems (e.g., control or display systems deployed onboard or otherwise utilized in conjunction with work machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The term module may be synonymous with unit, component, subsystem, sub-controller, circuitry, routine, element, structure, control section, and the like.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A crop orientation system comprising a controller having a processor and memory coupled to the processor and storing instructions, the processor executing the stored instructions to:
   determine first heading values for a first vehicle at intervals during a first crop planting event over a first field;
   generate a first set of histogram values representing the first heading values for the first vehicle during at least a portion of the first crop planting event over the first field; and
   generate display signals to render a first histogram display based on the first set of histogram values for a first user associated with the first vehicle.

2. The crop orientation system of claim 1, wherein the processor further executes the stored instructions to generate the display signals such that the first histogram display is formed by the first set of histogram values mapped onto a radial coordinate system.

3. The crop orientation system of claim 2, wherein the processor further executes the stored instructions to generate the display signals such that the first histogram display is formed by the first set of histogram values mapped onto a 360° radial coordinate system.

4. The crop orientation system of claim 2, wherein the processor further executes the stored instructions to generate the display signals such that the first histogram display is formed by the first set of histogram values mapped onto a 180° radial coordinate system in which histogram values within the first set of histogram values that are over 180° are indexed by 180°.

5. The crop orientation system of claim 1, wherein the processor further executes the stored instructions to receive first crop data associated with the first crop planting event and to generate a first recommendation for the first user associated with the first vehicle based on the first set of histogram values and the first crop data.

6. The crop orientation system of claim 1, wherein the processor further executes the stored instructions to:
   determine heading values for a second vehicle at intervals during a second crop planting event over a second field,
   generate a second set of histogram values representing the heading values for the second vehicle during at least a portion of the second crop planting event over the second field, and
   generate display signals to render a second histogram display based on the second set of histogram values for a second user associated with the second vehicle.

7. The crop orientation system of claim 1, wherein the processor further executes the stored instructions to:
   determine heading values for the first vehicle at intervals during a second crop planting event over the first field,
   generate a second set of histogram values representing the heading values for the first vehicle during at least a portion of the second crop planting event over the first field, and
   generate display signals to render a second histogram display based on the second set of histogram values for the first user associated with the first vehicle.

8. The crop orientation system of claim 7, wherein the processor further executes the stored instructions to receive first crop data associated with the first crop planting event and second crop data associated with the second crop planting event and to generate a first recommendation for the first user associated with the first vehicle based on the first set of histogram values, the first crop data, the second set of histogram values, and the second crop data.

9. The crop orientation system of claim 1, wherein the processor further executes the stored instructions to generate the first set of histogram values representing the heading values for the first vehicle during the first crop planting event as an entire event.

10. The crop orientation system of claim 1, wherein the processor further executes the stored instructions to determine the first heading values over time and generate the first set of histogram values representing the first heading values as the first heading values are determined such that the display signals render and update the first histogram display over time.

11. The crop orientation system of claim 1, wherein the processor further executes the stored instructions to:
   generate the first set of histogram values by counting each instance of a respective heading value, and
   generate the display signals such that the first histogram display is formed by a plurality of vectors in which a direction of each of the vectors represents the respective heading value and a length of each of the vectors represents the count of the respective heading value.

12. A crop orientation system associated with a work vehicle, comprising:
   a sensor configured to collect first heading values for the work vehicle during a first planting event over a first field;
   a controller in communication with the sensor, the controller configured to:
   generate a first set of histogram values representing the first heading values for the first vehicle during at least a portion of the first crop planting event over the first field, and
   generate display signals to render a first histogram display based on the first set of histogram values; and
   a display device in communication with the controller and configured to render the first histogram display on the work vehicle.

13. The crop orientation system of claim 12, wherein at least a portion of the controller is located off-board the work vehicle.

14. The crop orientation system of claim 12, wherein the controller is configured to generate the first set of histogram values and the display signals on-board the work vehicle.

15. The crop orientation system of claim 12, wherein the controller is configured to generate the display signals such that the first histogram display is formed by the first set of histogram values mapped onto a radial coordinate system.

16. The crop orientation system of claim 15, wherein the controller is configured to generate the display signals such that the first histogram display is formed by the first set of histogram values mapped onto a 360° radial coordinate system.

17. The crop orientation system of claim 15, wherein the controller is configured to generate the display signals such that the first histogram display is formed by the first set of histogram values mapped onto a 180° radial coordinate system in which histogram values within the first set of histogram values that are over 180° are indexed by 180°.

18. The crop orientation system of claim 12, wherein the controller is configured to generate the first set of histogram values representing the heading values for the vehicle during the first crop planting event as an entire event.

19. The crop orientation system of claim 12, wherein the controller is configured to determine the first heading values over time, and to generate the first set of histogram values representing the first heading values as the first heading values are determined such that the display signals render and update the first histogram display over time.

20. The crop orientation system of claim 12, wherein the controller is configured to generate the first set of histogram values by counting each instance of a respective heading value and to generate the display signals such that the first histogram display is formed by a plurality of vectors in which a direction of each of the vectors represents the respective heading value and a length of each of the vectors represents the count of the respective heading value.

* * * * *